(12) United States Patent  (10) Patent No.: US 7,111,895 B2
Rivers et al.  (45) Date of Patent: Sep. 26, 2006

(54) APPARATUS FOR PNEUMATIC OPERATION OF TRANSPORT CONTAINER SLIDING DOOR

(75) Inventors: David F. Rivers, Wallingford, CT (US); Russell McRoberts, Bremerton, WA (US); Celio J. Gomes, York, ME (US)

(73) Assignee: Patriot Lift Co., LLC, Kingshill, St. Croix, VI (US)

( * ) Notice: Subject to any disclaimer, the term of this patent is extended or adjusted under 35 U.S.C. 154(b) by 11 days.

(21) Appl. No.: 11/001,969

(22) Filed: Dec. 2, 2004

(65) Prior Publication Data

US 2006/0119132 A1    Jun. 8, 2006

(51) Int. Cl.
    *B00J 5/06*    (2006.01)
(52) U.S. Cl. .................................. 296/155 B; 169/188
(58) Field of Classification Search ................ 296/155, 296/146.6, 186.3; 160/1, 133, 188, 197, 160/201
    See application file for complete search history.

(56) References Cited

U.S. PATENT DOCUMENTS

| 2,815,962 | A |   | 12/1957 | McKay |
|-----------|---|---|---------|-------|
| 2,977,094 | A |   | 3/1961 | McKay |
| 3,314,655 | A |   | 4/1967 | Steele |
| 3,408,956 | A |   | 11/1968 | Rebenok et al. |
| 3,892,141 | A |   | 7/1975 | Phillips, Jr. et al. |
| 4,030,780 | A |   | 6/1977 | Petretti |
| 4,102,382 | A | * | 7/1978 | Vesbach ............ 160/188 |
| 4,169,581 | A |   | 10/1979 | Thurmond, Jr. |
| 4,188,552 | A | * | 2/1980 | Brimer ............ 310/13 |
| 4,232,989 | A |   | 11/1980 | Miller |
| 4,511,173 | A | * | 4/1985 | Wentzel ........... 296/156 |
| 4,518,303 | A |   | 5/1985 | Moser |
| 4,617,868 | A |   | 10/1986 | Wahlstrom et al. |
| 4,838,598 | A |   | 6/1989 | Hyde |
| 4,891,908 | A | * | 1/1990 | Aquilina ............ 49/199 |
| 5,004,267 | A |   | 4/1991 | Busby |
| 5,040,332 | A | * | 8/1991 | Aquilina ............ 49/200 |
| 5,118,244 | A |   | 6/1992 | Cook |
| 5,238,266 | A |   | 8/1993 | VanDenberg |
| 5,299,829 | A |   | 4/1994 | Rivers, Jr. et al. |
| 5,326,156 | A |   | 7/1994 | Heider |
| 5,392,836 | A |   | 2/1995 | West et al. |
| 5,509,687 | A |   | 4/1996 | Thorndike |
| 5,676,018 | A |   | 10/1997 | VanDenberg |
| 5,868,379 | A |   | 2/1999 | Ellis |
| 5,957,523 | A |   | 9/1999 | Haddad, Jr. |

(Continued)

OTHER PUBLICATIONS

Aero Industries, Inc., Model 500 V3.1 Sidemount Spring, Installation, Maintenance, and Safety Instructions, 2000.

(Continued)

*Primary Examiner*—Kiran B. Patel
(74) *Attorney, Agent, or Firm*—O'Shea, Getz & Kosakowski, P.C.

(57) ABSTRACT

An apparatus for automatically operating a sliding door of a transport container is provided. The apparatus includes a sliding door, a drive mechanism and a pneumatic motor. The drive mechanism is coupled to the sliding door and configured to allow movement of the sliding door. The pneumatic motor is coupled to the drive mechanism and is adapted to power the drive mechanism so that the sliding door moves in a first direction. A kit for retrofitting a motor assembly of a sliding door assembly mounted on a transport container, a trailer for transporting material having a sliding door assembly, and a system for transporting material having a sliding door assembly are also provided.

10 Claims, 4 Drawing Sheets

U.S. PATENT DOCUMENTS

| | | |
|---|---|---|
| 5,992,824 A | 11/1999 | Voss |
| 6,041,846 A | 3/2000 | Langlois |
| 6,089,544 A | 7/2000 | Ellis |
| 6,200,082 B1 | 3/2001 | Molenaar et al. |
| 6,220,810 B1 | 4/2001 | Wilkerson |
| 6,276,744 B1* | 8/2001 | Huber et al. ............. 296/155 |
| 6,279,487 B1 | 8/2001 | Gaydos et al. |
| 6,338,521 B1 | 1/2002 | Henning |
| 6,464,283 B1 | 10/2002 | Haddad, Jr. |
| 6,672,362 B1 | 1/2004 | Mullet et al. |
| 6,719,032 B1* | 4/2004 | Miers ...................... 160/188 |
| 6,983,785 B1* | 1/2006 | Altimore ................ 160/191 |
| 2004/0020607 A1* | 2/2004 | Aguirre et al. ........... 160/113 |
| 2005/0082015 A1* | 4/2005 | Altimore ................ 160/133 |
| 2005/0235563 A1* | 10/2005 | Mullet et al. .............. 49/200 |

OTHER PUBLICATIONS

Jost International, Power to Spare for the Easiest Landings Anywhere.

* cited by examiner

APPARATUS FOR PNEUMATIC OPERATION OF TRANSPORT CONTAINER SLIDING DOOR

BACKGROUND OF THE INVENTION

1. Field of the Invention

The present invention relates to pneumatic operation of sliding doors in general, and in particular to apparatus for pneumatic operation of the sliding door assemblies used on transport containers, such as trailers or other vehicles.

2. Background

The use of trucks, tractor-trailers, railroad cars, etc. for transporting palletized or containerized materials and bulk particulate commodities is well known. The hauling boxes or transport containers used to hold the materials typically require movable gates or doors allowing for the ingress and egress of the material through discharge openings.

In the typical flat-bottom trailer, it is well known to provide doors that are vertically oriented in the closed position and that slide upward to an open position. For instance, a sectional-type sliding door for trucks or trailers may include a series of similar horizontal panels connected by hinges that allows pivoting between the panels. It is common to use such sectional-type doors at the rear end openings of trucks or trailers. Typically, the sides of the panels, or the hinge means between the panels, have rollers which run in vertical tracks at the sides of the opening and horizontal legs above the rear of the opening. In the typical flat-bottom trailer, these doors are opened and closed manually. Manual operated doors expose the operator to potential injuries. Moreover, manual operated doors are not amenable to partial opening in order to restrict flow of particulate matter through the discharge opening.

Similar to the section-type doors are sheet doors. Sheet doors have flexible door panels that, typically, are guided around rollers between the open and closed positions. Other known sliding doors include roller doors, which are made of multiple, relatively thin, horizontal slats. Rotation of a drum or roller located at the top of the door causes the roller door to wrap around (or unwrap from) the drum, thus opening (or closing) the door.

Flat-bottomed or hopper-type trailers capable of self-unloading bulk particulate and/or chunk material via a conveyor mechanism and having slidable gates for providing a variable size discharge opening during an initial opening stage are also known. Known mechanisms for sliding and/or pivoting the gate, or only a portion of the gate, include hydraulic or pneumatic cylinders, cables attached to an electric winch or drum, or manual operation. In some instances, further opening the gate allows it to pivot, thereby providing an unrestricted discharge opening for unloading the contents from the box.

It is also known to provide movable gates for controlling the amount of particulate matter being discharged from pivoting or tilt-type transport containers, i.e., dump truck-type beds. Typically, the rear walls of such dump truck-type beds are fashioned as gates that pivot around pins located at the top of the rear wall. One known design for a tilt bed incorporates a rear wall having a movable gate that both slides and pivots. A pair of hydraulic rams, located on either side of the gate, slides the gate upward until a select height is reached, whereupon the gate may pivot completely open. In another known design, a lower portion of a pivotable gate is independently pivotable via hydraulic cylinders and a linkage mechanism.

Typically, piston/cylinder mechanisms, whether hydraulic or pneumatic, are bulky and heavy and, unlike motors, are not amenable to being retrofit. Further, all hydraulic drive mechanisms are not environmentally friendly, operating with potentially harmful hydraulic fluids. Even further, pressurized supplies of hydraulic fluid for operating the hydraulic cylinders are typically not transported with the transport container.

What is needed is an apparatus that is relatively lightweight, small, and environmentally friendly. Moreover, with respect to tractor-trailers, what is needed is an apparatus that is powered from existing pneumatic systems carried by the tractor. Additionally, there is a need to retrofit existing transport containers constructed with hydraulic or electric motors for raising or lowering sliding doors with pneumatically powered sliding door systems, where such retrofit is conducted with minimal reconstruction or replacement of the components of the existing conveyor systems.

DISCLOSURE OF THE INVENTION

According to the present invention, an apparatus for automatically operating a sliding door of a transport container having a discharge opening is provided. The apparatus includes a sliding door, a drive mechanism and a pneumatic motor. The drive mechanism is coupled to the sliding door and configured to allow movement of the sliding door. The pneumatic motor is coupled to the drive mechanism and is adapted to power the drive mechanism so that the sliding door moves in a first direction.

In a one embodiment, the pneumatic motor can be connected to a pre-existing compressed air supply of a vehicle's emergency brake system. A pneumatic motor avoids the problems associated with hydraulic motors and electrical motors in an outdoor environment.

In another embodiment, a kit for retrofitting a motor assembly of a sliding door assembly mounted on a transport container is provided. The kit includes a gearbox, a pneumatic motor and a controller mechanism. The gearbox has an input shaft and an output shaft. The output shaft is configured to be operatively connected to a drive shaft of the sliding door assembly. The pneumatic motor is coupled to the input shaft of the gearbox and configured to receive a compressed air supply. The controller mechanism is configured to selectively control the pneumatic motor and the gearbox so as to drive the sliding door assembly.

In a further embodiment, a trailer for conveying material is provided. The trailer includes a transport container having a discharge opening and a sliding door mounted on the transport container. The sliding door is selectively operable between a first position wherein the discharge opening is closed and a second position wherein the discharge opening is at least partially open. The trailer further includes a drive mechanism operatively coupled to the sliding door and configured to allow movement of the sliding door and a pneumatic motor operatively coupled to the drive mechanism and configured to power the drive mechanism so that the sliding door moves in a first direction. The pneumatic motor is configured to receive compressed air. A compressed air control mechanism is operatively coupled to the pneumatic motor and configured to be operatively coupled to an air powered emergency brake system of a vehicle.

In another embodiment, a system for conveying material is provided. The system includes a transport container having a discharge opening and a vehicle for transporting the transport container. The vehicle has an air powered emergency brake system. A sliding door is mounted on the transport container and is selectively operable between a first position wherein the discharge opening is closed and a second position wherein the discharge opening is at least partially open. A drive mechanism is coupled to the sliding door and is configured to allow movement of the sliding door. A pneumatic motor is coupled to the drive mechanism and configured to power the drive mechanism so that the sliding door moves in a first direction. A compressed air source is operatively coupled to the pneumatic motor to provide an air supply to the pneumatic motor, wherein the compressed air source is the air powered emergency brake system of the vehicle.

In addition to providing improvements to existing transport container sliding door assemblies relying on manual operation or hydraulic drive motors, the present invention provides several advantages over existing systems. For example, the present invention may be retrofit to existing transport container sliding door assemblies. This retrofitting may be accomplished with minimal reconstruction, redesign or replacement of components of the existing sliding door systems. The present invention also has the advantage of using sources of air available to vehicles to operate the pneumatic motor to power the sliding door assembly.

These and other objects, features and advantages of the present invention will become apparent in light of the drawings and detailed description of various embodiments of the present invention provided below.

DETAILED DESCRIPTION OF EMBODIMENTS OF THE PRESENT INVENTION

Figure 1:
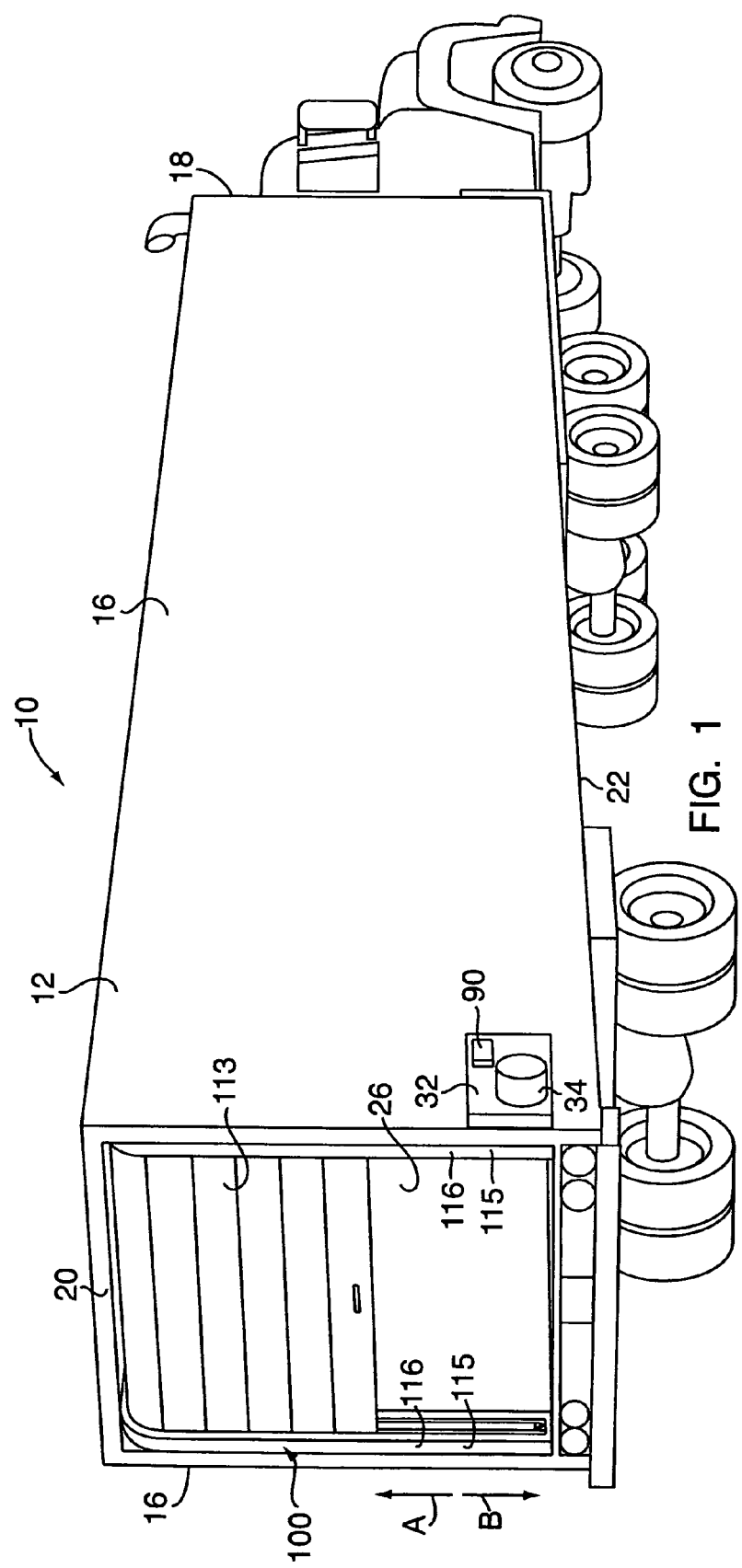
FIG. 1 is a diagram of a perspective view of one embodiment of the present invention as adapted for use with a tractor-trailer having a flat-bottom transport container.
Figure 2:
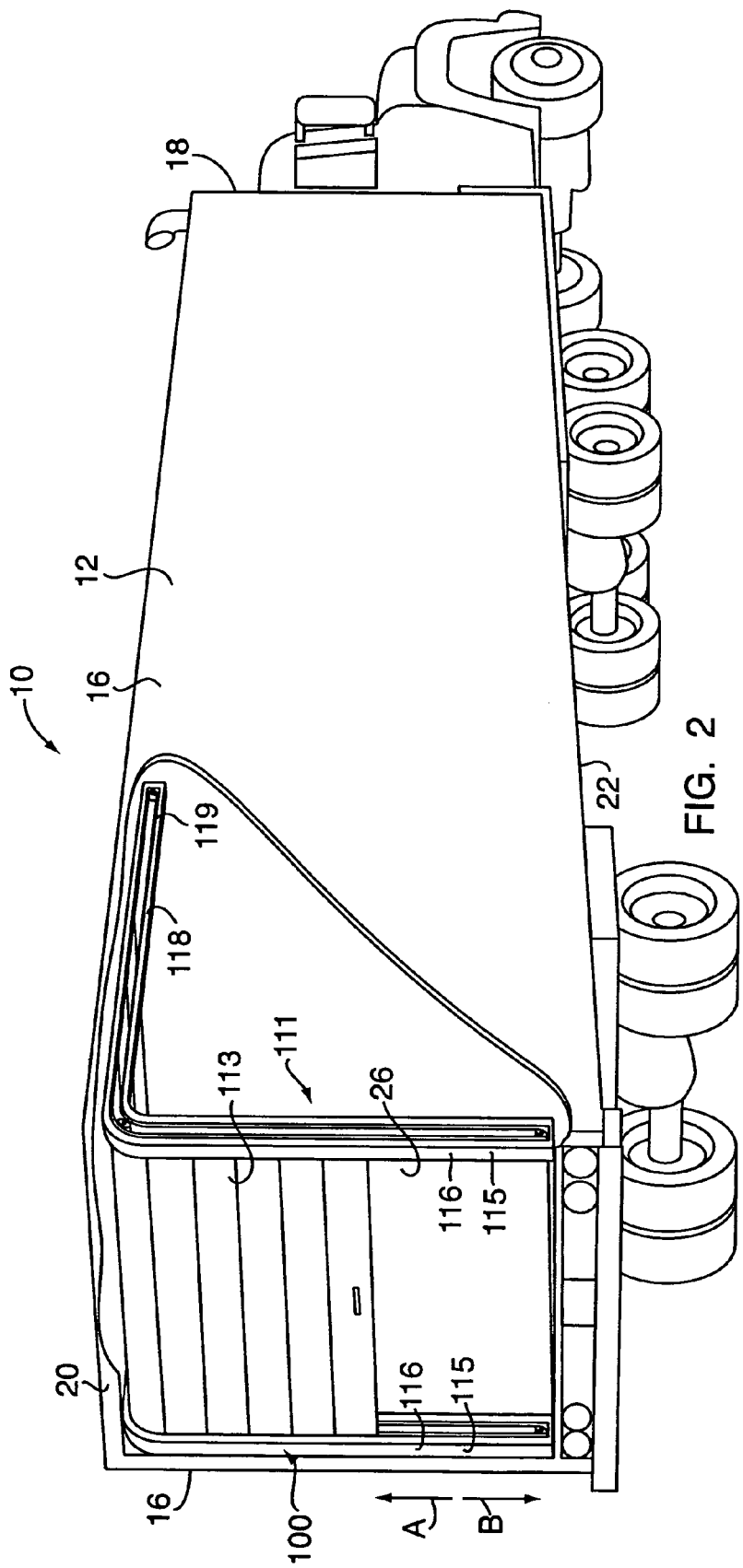
FIG. 2 is a diagram of a perspective view of the embodiment of FIG. 1 showing more details of the sliding door assembly.

Referring to FIGS. 1 and 2, one embodiment of the present invention includes a gearbox, a pneumatic motor and a controller operatively connected to a sliding door assembly of a transport container having a discharge opening.

As shown in FIG. 1, a tractor-trailer having a transport container is generally designated by reference numeral 10. Tractor-trailer 10 includes a flat-bottom transport container 12 for storing and transporting material or goods. While a tractor-trailer flat-bottom transport container is shown, the present invention has utility on other transport container designs, including, but not limited to, general purpose delivery trucks, hopper-type trailers, flat-bottom and hopper-type railroad cars. As illustrated in FIG. 1, container 12 has a generally rectangular configuration, and includes generally opposed side walls 16, a front wall 18, a rear wall 20, which is generally opposed to front wall 18, and a floor 22.

In one embodiment of the present invention, rear wall 20 includes a sliding door assembly 100, which is slidably movable between a closed position and an open position. In the open position, material is allowed to pass into or out of container 12 through a discharge opening 26. In a partially open position, sliding door assembly 100 may be used to meter or partially restrict the flow of material through discharge opening 26.

Sliding door assembly 100 may encompass the entire rear wall or only a portion of rear wall 20. Furthermore, sliding door assembly is not restricted to rear wall 20, but could be mounted on any wall of transport container 12. Even further, a sliding door assembly according to the present invention may be incorporated onto a flat bottom-type transport container, a tilt bed-type transport container, a hopper-type transport container, or any other type transport container.

As best shown in FIG. 2, sliding door assembly 100 includes a drive mechanism 111 and a sliding door 113. Sliding door assembly 100, as well as drive mechanism 111 and sliding door 113, may conform to any sliding door assembly as known in the art.

For example, sliding door assembly 100 may include a pair of tracks 115, each track having a pair of vertical side sections 116 and a pair of horizontal side sections 118. Vertical side sections 116 are located on opposite sides of discharge opening 26 and extending substantially the full height of discharge opening 26, and horizontal side sections 118 are located on side walls 16 of transport container 12, near the top of the walls. Vertical side sections 116 and horizontal side sections 118 are smoothly joined, creating a radius of curvature near the upper edge of discharge opening 26. Track 115 may be formed from a C-channel. Positioned within each track 115 may be a section-type sliding door 113 of the kind that is known in the art and the operation thereof need not be discussed further herein. A pulley/cable system 119 located within the drive side track 115, a pintle chain/sprocket system also optionally located within the drive side track 115, or any other drive mechanism known in the art may be used to move sliding door 113.

Figure 3:
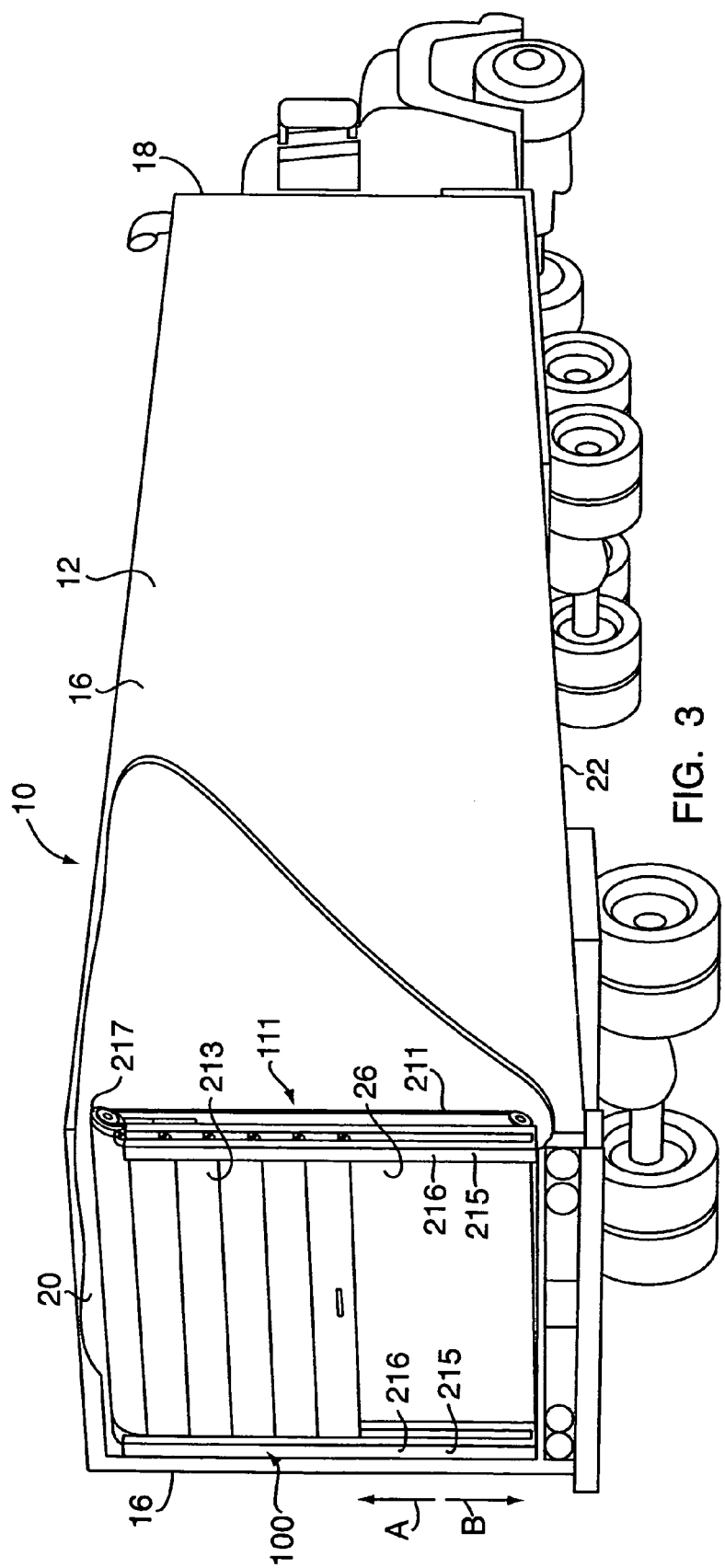
FIG. 3 is a diagram of a perspective view of another embodiment of the sliding door assembly.

In an alternative embodiment, as shown in FIG. 3, sliding door assembly 100 may include a frame 215 having a pair of vertical side sections 216 extending substantially the full height of discharge opening 26. Rotatably mounted adjacent to, and extending parallel with, the top edge of discharge opening 26 may be an elongate drum 217 around which a flexible roller door 213 is secured. Typically, the side edges of roller door 213, or rollers connected to the side edges of roller door 213, are slidably positioned within the tracks forming vertical side sections 216. Depending upon the direction of rotation of drum 217, door 213 will either open or close. Drum 217 may be provided with a coil spring (not shown), to reduce the power required to raise and lower door 213. Rotation of drum 217 may be accomplished by a pintle chain and sprocket drive mechanism 211, which may be mounted within or adjacent to the drive side section 216.

Regardless of the exact configuration of sliding door assembly 100, drive mechanism 111 is provided to drive sliding door 113 in a first direction A to open discharge opening 26. In one embodiment, drive mechanism 111 is also configured to drive sliding door 113 in a second direction B to close discharge opening 26.

In the present invention, a pneumatic motor 34 is mounted on the side of container 12 proximate to gearbox 32. Motor 34 includes an output motor shaft 36 operatively coupled to gearbox 32. The present invention permits and facilitates retrofitting of sliding door assemblies with such pneumatic motors with minimal reconstruction and redesign of the existing sliding door assembly and its components. For example, a mounting plate 38 can be secured to container 12 for mounting of motor 34 in a location proximate to gearbox 32, although the pneumatic motor may also be mounted directly to the transport container or to the gearbox. Motor 34 is preferably a commercially available pneumatic gear motor that is powered by an external compressed air source. An example of an acceptable pneumatic gear motor is pneumatic gear motor model no. 33MA-220S1 produced by WADCO, a division of Ingersoll-Rand. Preferably, the motor is a vane-type rotary driven motor having a gear reduction assembly with an 80–100 to 1 gear reduction ratio.

Figure 4:
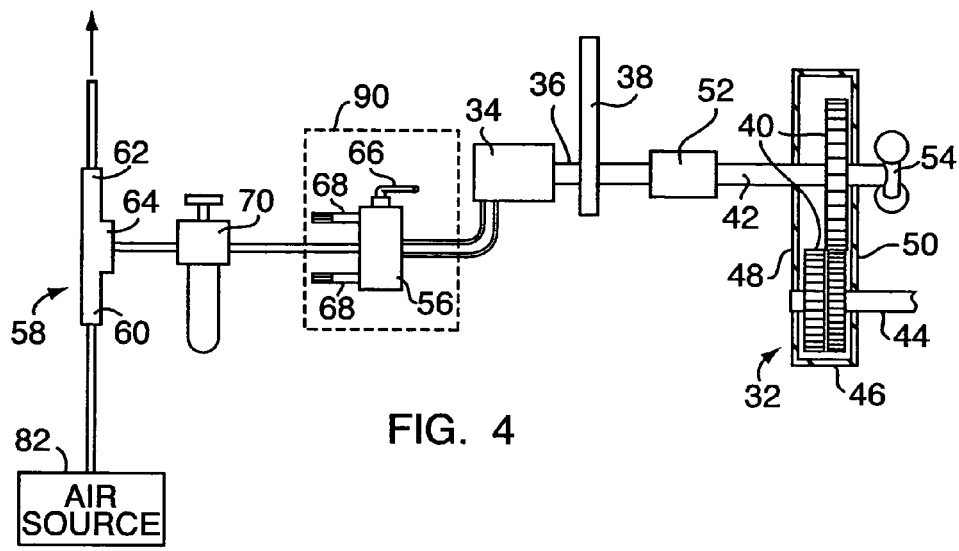
FIG. 4 is a partial schematic diagram of an embodiment of a compressed air supply system, controller, motor and gearbox of the present invention.
Figure 5:
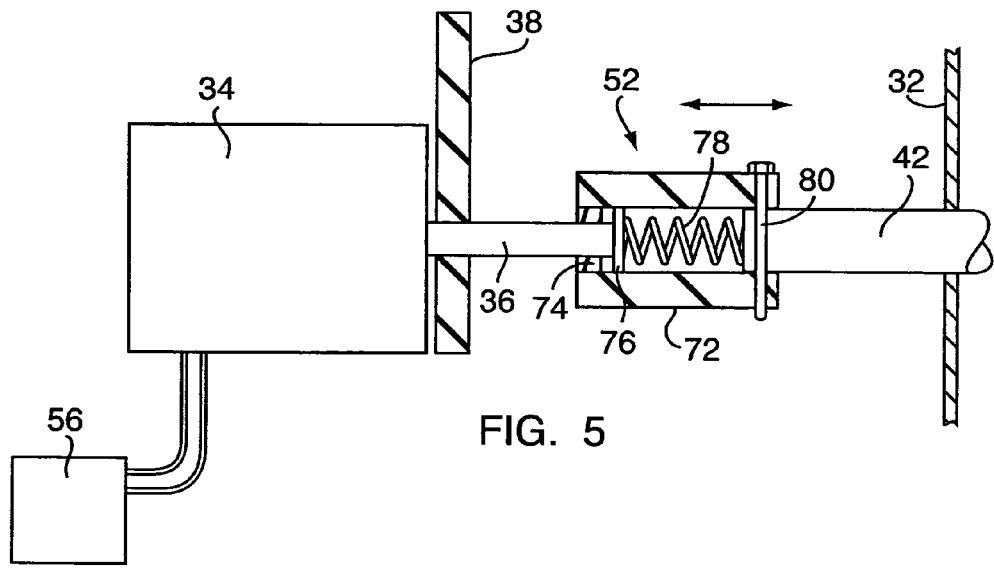
FIG. 5 is a partial schematic diagram of a coupler located between the gearbox and the pneumatic motor that may be used in an embodiment of the present invention.

Gearbox 32 includes a plurality of gears 40, an input shaft 42, an output shaft 44, and a housing 46 having a first side 48 and a second side 50. As shown in FIG. 4, input shaft 42 and output shaft 44 extend out from the opposite first and second sides 48 and 50, respectively, of housing 46. On first side 48 of housing 46, input shaft 42 is coupled to motor shaft 36 of motor 34. Preferably, a hardened socket coupler 52 receives and is connected to both input shaft 42 and motor shaft 36 (e.g., a through pin 80 or the like, as shown in FIG. 5, may be used to connect input shaft 42 to coupler 52). Input shaft 42 and output shaft 44 communicate with gears 40 in gearbox 32. Gears 40 are mounted within housing 46 in an arrangement that creates mechanical advantage for input shaft 42 relative to output shaft 44—i.e., force transmitted to input shaft 42 is multiplied through gears 40 to create a greater force available at output shaft 44. The arrangement of gears 40 and the amount of mechanical advantage created by gears 40 is variable to the application at hand. In one embodiment, gearbox 32 includes a planetary gear assembly.

On second side 50 of housing 46, output shaft 44 is coupled to drive mechanism 111, for example, via a drive shaft and a universal joint (not shown).

Pneumatic motor 34 is operable with compressed air provided from an air source generally designated in FIG. 4 by reference numeral 82. Air source 82 may be a separate cylinder attached to transport container 12, or in another embodiment, an existing air supply from an air brake system 84 of tractor trailer 10 or other vehicle. In particular, compressed air may be supplied to pneumatic motor 34 from an emergency brake system of the vehicle.

A controller mechanism 90 is provided to control the flow of compressed air to pneumatic motor 34. In one embodiment, controller mechanism 90 includes a valve 56 operatively coupled to a vehicle's emergency brake air supply to drive motor 34 and provide the power to turn the gearbox shafts 42 and 44. Preferably a connector 58 is provided on the emergency brake line so that the air supply can be directed to motor 34. As shown in FIG. 4, connector 58 is a tee-connector. Connector 58 has an input port 60 to receive compressed air from air source 82, a first output port 62 to direct the air supply to the emergency brake system of the vehicle, and a second output port 64 to direct the air supply to motor 34. Controller valve 56 may be connected to second output port 64 to control the air supply to motor 34.

Preferably, valve 56 acts as an air shutoff valve that controls the direction and amount of air motor 34 receives. In a one mode of operating of the present invention, air shutoff valve 56 will only provide airflow to motor 34 if valve 56 is manually opened and retained in the open position (e.g., by manually moving a spring-biased lever 66 as shown in FIG. 4). That is, air will be directed to motor 34 if the operator moves and holds lever 66. Once lever 66 is returned to the "off" position, the air supply to the motor 34 will be shut off. If the lever 66 is released, valve 56 will automatically shut off. This prevents the operator from leaving the air supply connected to motor 34 and not the emergency brake line, even when the operation of the sliding door assembly 100 is completed. This ensures that a sufficient air supply is provided to the emergency brake line when the vehicle is being driven.

In one embodiment, valve 56 is a three-position valve that includes an "off" position, a first supply position ("open"), and a second supply position ("close"). As noted above, valve 56 may be spring-biased to the "off" position. Lever 66 enables the operator to move the valve between the "off" position and either of the first or second supply positions. Valve 56 is connected to motor 34 such that air passing through valve 56 when in the first supply position causes motor 34 to rotate in a first direction (e.g., clockwise) associated with moving sliding door mechanism 100 in a first direction for opening transport container 12. Likewise, valve 56 is connected to motor 34 such that air passing through valve 56 when in the second supply position causes motor 34 to rotate in a second direction (e.g., counterclockwise) associated with moving sliding door mechanism 100 in a second direction for closing transport container 12. The specific directions identified herein are used for illustration purposes only, and the present invention is not intended to prescribe specific directions for specific actions (i.e., clockwise may be used to move the sliding door mechanism in the second direction for opening the transport container). Valve 56 employs one or more air escape ports that may utilize mufflers 68 to allow unneeded or excess air to escape. Pneumatic control valves are known in the art and the operation thereof need not be discussed further herein. Preferably, the valves used in the operation described above are commercially available valves.

In alternative embodiments, valve 56 may be a power-assisted type control valve that utilizes one or more solenoids, for example to actuate the valve to the first or second positions. Such a power-assisted valve may be configured so that the user operates the valve in proximity of the valve, or at a position remote from the valve (e.g., from the cab of a tractor trailer). Even with such alternative valve designs, however, the valve is preferably biased towards the "off" position when not in use for the safety reasons identified above.

In another embodiment, an automatic lubrication unit 70 (e.g., an oil mist lubricator) is provided upstream of pneumatic motor 34, and more preferably upstream of motor 34 and valve 56. Lubrication unit 70 treats the air with a fine oil mist so that valve 56 and motor 34 are lubricated and so that they can operate efficiently. Automatic lubrication units are known in the art and will not, therefore, be further described herein.

A coupler 52 between the input shaft 42 of gearbox 32 and motor shaft 36 accommodates axial movement of input shaft 42, for example, if gearbox 32 has the capability to shift gears. Alternatively, input shaft 42 on second side 50 of gearbox housing 46 can be provided with a knob 54. Gearbox 32 can be changed from a high gear to a low gear, or vice versa, by axially moving knob 54 and input shaft 42 inward or outward, depending on the initial position of the input shaft and the desired gear. Moving input shaft 42 axially to change the gear causes input shaft 42 extending from first side 48 of gearbox housing 46 through to second side 50 of gearbox housing 46 to correspondingly move, which movement coupler 52 is adapted to accommodate.

An example of a type of coupler for use in the present invention is diagrammatically shown in FIG. 5. There, coupler 52 includes a housing 72, a motor shaft flange 74, a plate 76, and a spring 78. Coupler housing 72 has a gearbox end and a motor end receiving and accommodating input shaft 42 and motor shaft 36 respectively. Input shaft 42 and motor shaft 36 may be connected to coupler housing 72 in a variety of known ways. As shown, for example, in FIG. 5, input shaft 42 is connected to coupler housing 72 using through pin 80.

Motor shaft flange 74 is disposed adjacent the motor end of coupler housing 72 and includes an aperture for slidably receiving motor shaft 36. Input shaft 42 is received within and fixed to the gearbox end of coupler housing 72. Spring 78 and plate 76 are disposed within coupler housing 72 with spring 78 disposed towards input shaft 42 and plate 76 disposed towards motor shaft 36 and retained by motor shaft flange 74.

When gearbox 32 is in high gear, input shaft 42 is in a first axial position. When knob 54 and attached input shaft 42 are pushed inward to change to the low gear, input shaft 42 moves axially against the pressure of spring 78 a distance sufficient to engage the low gear. Coupler 52 moves axially along motor shaft 36, compressing spring 78. When the operator moves knob 54 and input shaft 42 back into the high gear, spring 78 acts against input shaft 42 and returns input shaft 42 to the first axial position associated with the high gear.

In the operation of one embodiment of the present invention, the operator parks the vehicle, for instance, tractor trailer 10 in a discharge location, and selects a desired gear for gearbox 32. The operator then moves control valve 56 into the supply position designated "open" causing sliding door 113 of sliding door assembly 100 to open discharge opening 26. In the "close" position, the compressed air powers pneumatic motor 34, which drives gearbox 32 and attached drive mechanism 111, which in turn operates mechanical means communicating with sliding door 113. When the operator wishes to stop movement of sliding door 113, the operator releases valve lever 66 and valve 56 automatically returns to the "off" position.

An embodiment of the present invention apparatus for automatic operation of a sliding door of a transport container is a retrofit kit for replacing a hydraulic (or electrical) motor and gearbox systems with a pneumatic motor and gearbox system. The retrofit kit includes a pneumatic motor 34, a controller mechanism 56 and a gearbox 32. Motor 34 and controller mechanism 90 are connected to an air source 82 as described above. Gearbox 32 is coupled with the existing drive mechanism, with motor 34 being coupled with the gearbox 32 as described above. In addition, motor 34 and controller mechanism 90 are connected to air source 82 as described above. In both instances, the operation of the retrofitted system is the same as or similar to that described above.

Although the present invention has been described with respect to improvements in sliding door systems for general cargo-type flat-bottom beds or trailers, the claimed invention may be easily adapted for used with any palletized, containerized or bulk material transporters. Further, although this invention has been shown and described with respect to the detailed embodiments thereof, it will be understood by those skilled in the art that various changes in form and detail thereof may be made without departing from the spirit and scope of the invention.

What is claimed is:

1. An apparatus for automatically operating a sliding door of a transport container having a discharge opening, which transport container is attachable to a vehicle, the apparatus comprising:
    a sliding door mounted to the transport container;
    a drive mechanism coupled to said sliding door and configured to allow movement of said sliding door; and
    a pneumatic motor coupled to said drive mechanism operable to power said drive mechanism so that said sliding door moves in a first direction, and selectively connectable to compressed air within an emergency brake system of the vehicle.

2. The apparatus of claim 1, wherein the transport container is coupled to a vehicle and said compressed air source is an air brake system of said vehicle.

3. The apparatus of claim 1, further comprising:
    a controller mechanism configured to selectively control said pneumatic motor,
    wherein said controller mechanism includes an airflow valve configured to control the amount of the air supplied to said motor.

4. The apparatus of claim 3, wherein said airflow valve includes:
    a first operating position providing an airflow to said motor to rotate said motor in said first direction, said first operating position being associated with said sliding door opening;
    a second operating position providing an airflow to said motor to rotate said motor in a second direction, said second operating position being associated with said sliding door closing; and
    a third operating position restricting airflow from said motor.

5. The apparatus of claim 4, wherein said airflow valve is biased towards said third operating position.

6. The apparatus of claim 1, further comprising:
    a lubricator unit configured to provide a lubricant mist into said air supply supplied to said motor.

7. The apparatus of claim 1, further comprising:
    a gearbox having a plurality of gears, an input shaft and an output shaft, said gearbox configured to shift gears,
    wherein said pneumatic motor includes a rotatable motor shaft that is coupled to said input shaft of said gearbox, and said drive mechanism is coupled to said output shaft of said gearbox.

8. The apparatus of claim 7, wherein said gearbox includes a planetary gear assembly.

9. The apparatus of claim 8, wherein said drive mechanism includes a sprocket and pintle chain assembly.

10. An apparatus for automatic operation of a sliding door assembly of a transport container, which transport container is attachable to a vehicle, wherein the sliding door assembly includes a drive mechanism operable to move a sliding door in a first direction, the apparatus comprising:
    a gearbox having an input shaft and an output shaft, said output shaft being operatively connected to the drive mechanism of the sliding door;
    a pneumatic motor coupled to said input shaft of said gearbox, said motor operable to power the gearbox so that said sliding door moves in the first direction, and selectively connectable to compressed air within an emergency brake system of the vehicle;
    a controller mechanism configured to selectively control said pneumatic motor and said gearbox to operate the sliding door assembly.

* * * * *